(12) United States Patent
Abilez (10) Patent No.: US 12,498,083 B2
(45) Date of Patent: Dec. 16, 2025

(54) PORTABLE STAND APPARATUS

(71) Applicant: David Abilez, Ballwin, MO (US)

(72) Inventor: David Abilez, Ballwin, MO (US)

( * ) Notice: Subject to any disclaimer, the term of this patent is extended or adjusted under 35 U.S.C. 154(b) by 35 days.

(21) Appl. No.: 18/537,029

(22) Filed: Dec. 12, 2023

(65) Prior Publication Data

US 2025/0189072 A1 Jun. 12, 2025

(51) Int. Cl.
*F16M 11/28* (2006.01)
*F16M 11/38* (2006.01)

(52) U.S. Cl.
CPC .............. *F16M 11/28* (2013.01); *F16M 11/38* (2013.01); *F16M 2200/028* (2013.01)

(58) Field of Classification Search
CPC ... F16M 11/28; F16M 11/38; F16M 2200/028
USPC .... 248/690, 692, 214, 227.1, 301, 303, 304, 248/146, 158, 161, 407, 408, 159, 157, 248/163.1, 431, 432, 166, 168, 169, 170, 248/171; 220/592.01, 592.17, 592.18, 220/592.2, 476, 478, 480, 481, 482, 694, 220/700, 701, 737, 740
See application file for complete search history.

(56) References Cited

U.S. PATENT DOCUMENTS

| | | | | |
|---|---|---|---|---|
| 1,858,299 | A * | 5/1932 | Korn | A47G 23/0208 211/74 |
| 8,322,666 | B2 * | 12/2012 | Duemmel | A47G 23/0208 248/163.1 |
| D675,489 | S * | 2/2013 | Albornoz | D7/701 |
| 11,988,478 | B1 * | 5/2024 | Carpenter | A45F 3/44 |
| 2007/0267551 | A1 * | 11/2007 | Townsend | A61M 5/1415 248/311.2 |
| 2009/0294622 | A1 * | 12/2009 | Medders | A47G 7/041 248/156 |
| 2009/0301927 | A1 * | 12/2009 | Fvlbrook | A61B 90/57 248/304 |
| 2024/0321253 | A1 * | 9/2024 | Bustamante | H02J 50/10 |

* cited by examiner

Primary Examiner — Alfred J Wujciak (57) ABSTRACT

A portable stand apparatus for supporting items in a container above the ground includes a support assembly and a container mounted to a top end of the support assembly. The support assembly is deployable to support the container above a ground surface using tripod-arranged legs. Electronic charging components are embedded in the container so that electronic devices may be charged when positioned in the container, on the container, or nearby the container. Cup holders are mountable around the container, and hooks are provided for hanging towels or other items to the container.

18 Claims, 8 Drawing Sheets

PORTABLE STAND APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to portable support stands and more particularly pertains to a new portable support stand for supporting items in a container above the ground.

(2) Description of Related Art Including Information Disclosed Under 37 CFR 1.97 and 1.98

The prior art relates to portable support stands, including various ones which have collapsible tripod members for facilitating transport and storage of the support stand. Various platforms and containers are used in such apparatuses to hold various items above the ground. However, the prior art fails to describe a portable support stand with a container mounted atop a support assembly and cup holders mounted around the container. The prior art also fails to describe such an apparatus having electrical charging components and hooks for supporting towels or other items.

BRIEF SUMMARY OF THE INVENTION

An embodiment of the disclosure meets the needs presented above by generally comprising a support assembly which is configured to be removably positioned atop a ground surface. A container is mounted to a top end of the post. The container has a base wall and a perimeter wall coupled to each other, and the perimeter wall extends upwardly from the base wall. The base wall and the perimeter wall define a storage space, and an upper edge of the perimeter wall defines an opening to the storage space. A plurality of cup holders is removably couplable around the perimeter wall of the container on the exterior side of the container. Each cup holder comprises a bottom wall and a peripheral wall. The peripheral wall is coupled to and extends away from the bottom wall. The bottom wall and the peripheral wall define a cavity with an open end distal from the bottom wall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new portable support stand embodying the principles and concepts of an embodiment of the disclosure and generally designated by the reference numeral 10 will be described.

As best illustrated in FIGS. 1 through 8, the portable stand apparatus 10 generally comprises a support assembly 12 configured to be removably positioned on a ground surface. The support assembly 12 comprises a post 14 and a retainer 24. The post 14 is telescopically adjustable. The post 14 has an upper member 16 and a lower member 18, wherein the upper member 16 is slidably coupled to the lower member 18. The retainer 24 is engageable with the post 14 to retain the post 14 in a selected length. The retainer 24 comprises a spring button that is biased to extend through each of the upper member 16 and the lower member 18 of the post 14. In other embodiments, the retainer 24 may comprise a locking pin, a clamp, or the like.

The support assembly 12 also includes a plurality of legs 26 and a linkage assembly 32. The plurality of legs 26 is coupled to a bottom end 20 of the post 14. The legs 26 extend downwardly and radially outwardly from the post 14 when the plurality of legs 26 is positioned in a deployed configuration 28. The legs 26 are movable with respect to the post 14 such that each leg 26 is foldable toward the post 14 to position the plurality of legs 26 in a collapsed configuration 30. The linkage assembly 32 is coupled to the post 14 and the plurality of legs 26 to facilitate moving the plurality of legs 26 between the deployed configuration 28 and the collapsed configuration 30. The linkage assembly 32 comprises a slider 34 which is slidably coupled to the post 14 and pivotally coupled to each leg 26 of the plurality of legs 26. The linkage assembly 32 also comprises a plurality of links 36, each of which is pivotally coupled to the post 14 at one end of the link 36 and pivotally coupled to an associated leg 26 of the plurality of legs 26 at another end of the link 36. The plurality of legs 26 moves from the deployed configuration 28 to the collapsed configuration 30 by moving the slider 34 upwardly with respect to the post 14. The upward movement draws the legs 26 upwardly and causes the links 36 to orient the legs 26 to lie substantially parallel to and adjacent to the post 14 when the legs 26 reach the collapsed configuration 30.

Figure 1:
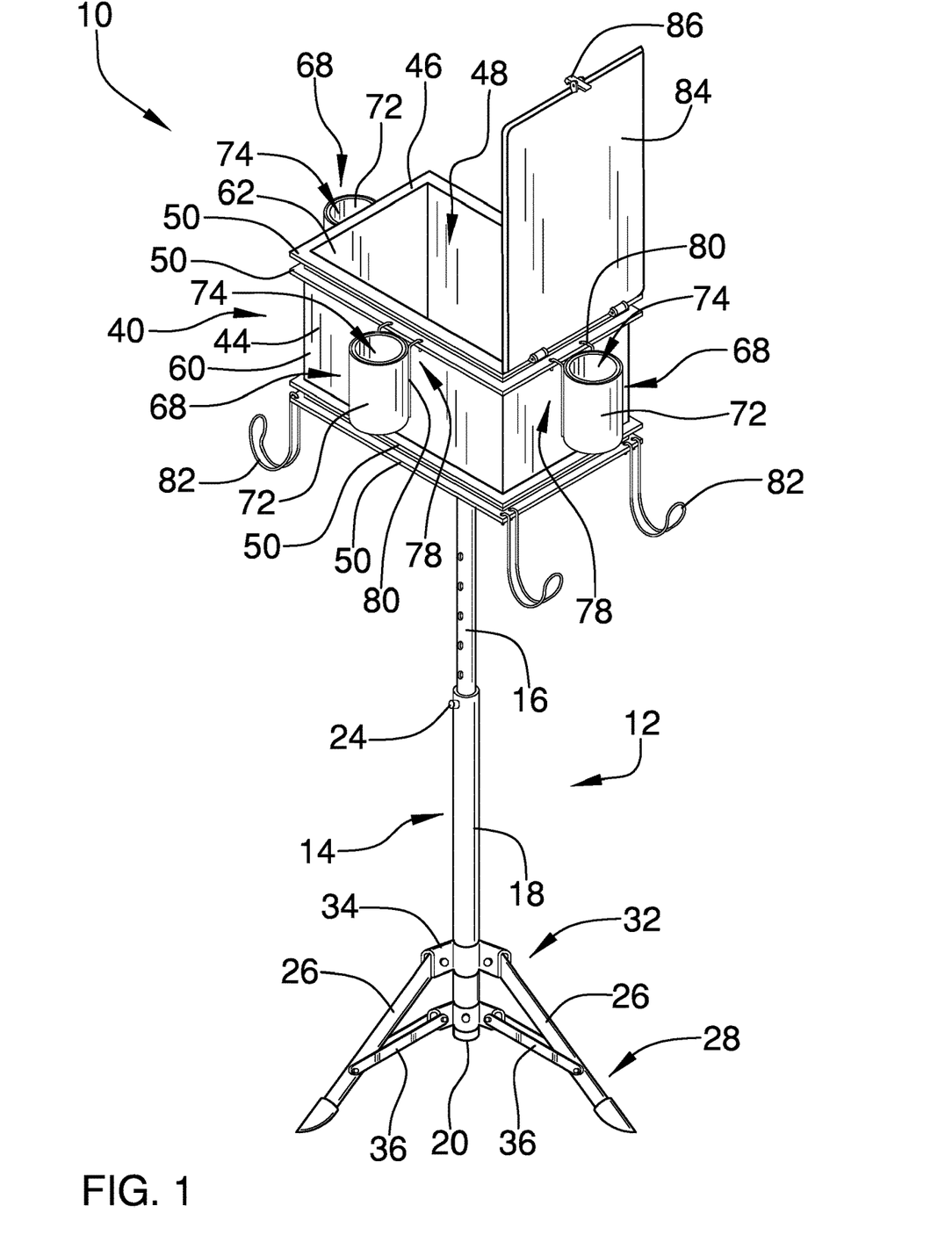
FIG. 1 is a top perspective view of a portable stand apparatus according to an embodiment of the disclosure.
Figure 2:
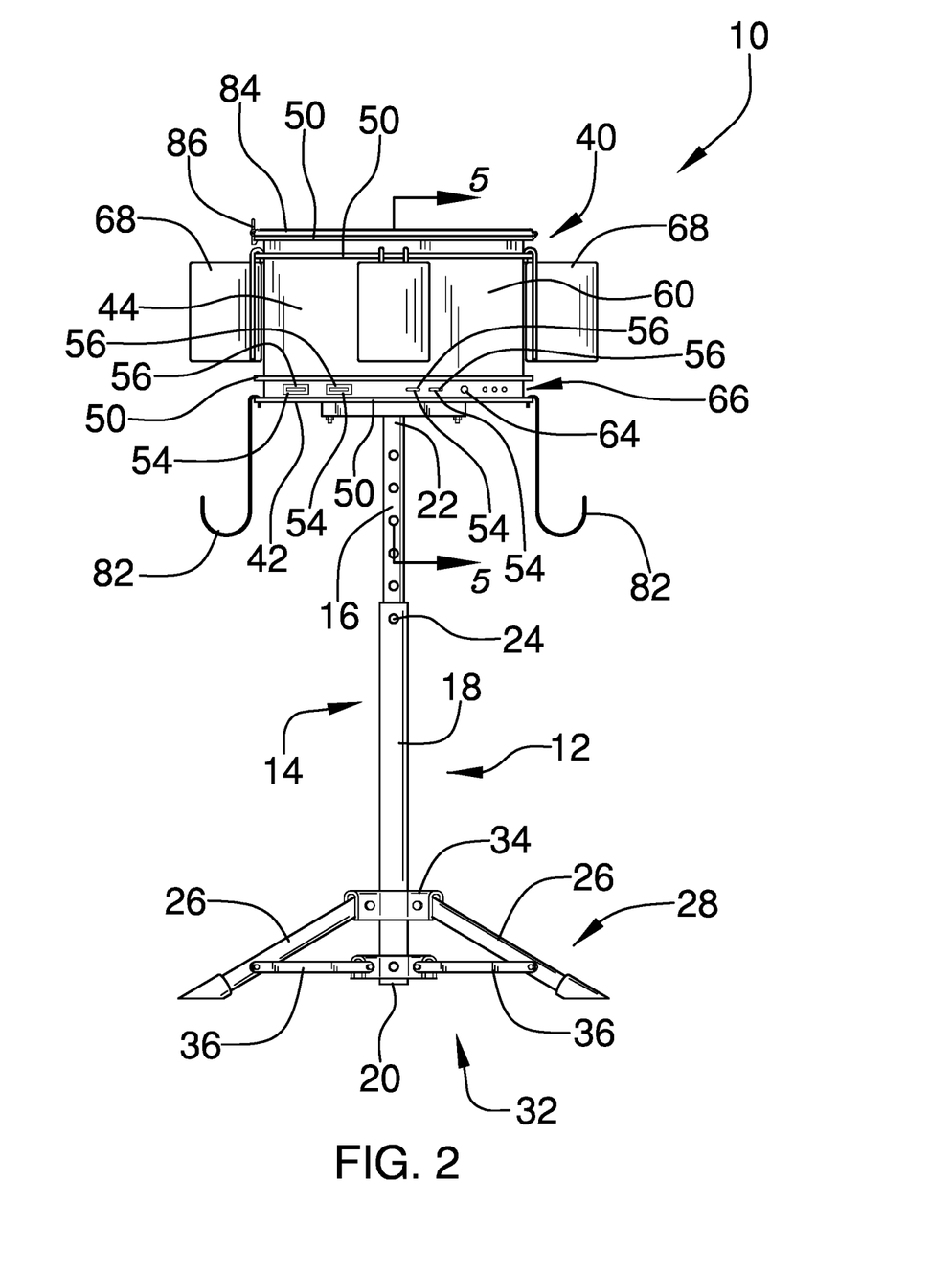
FIG. 2 is a front view of an embodiment of the disclosure.
Figure 3:
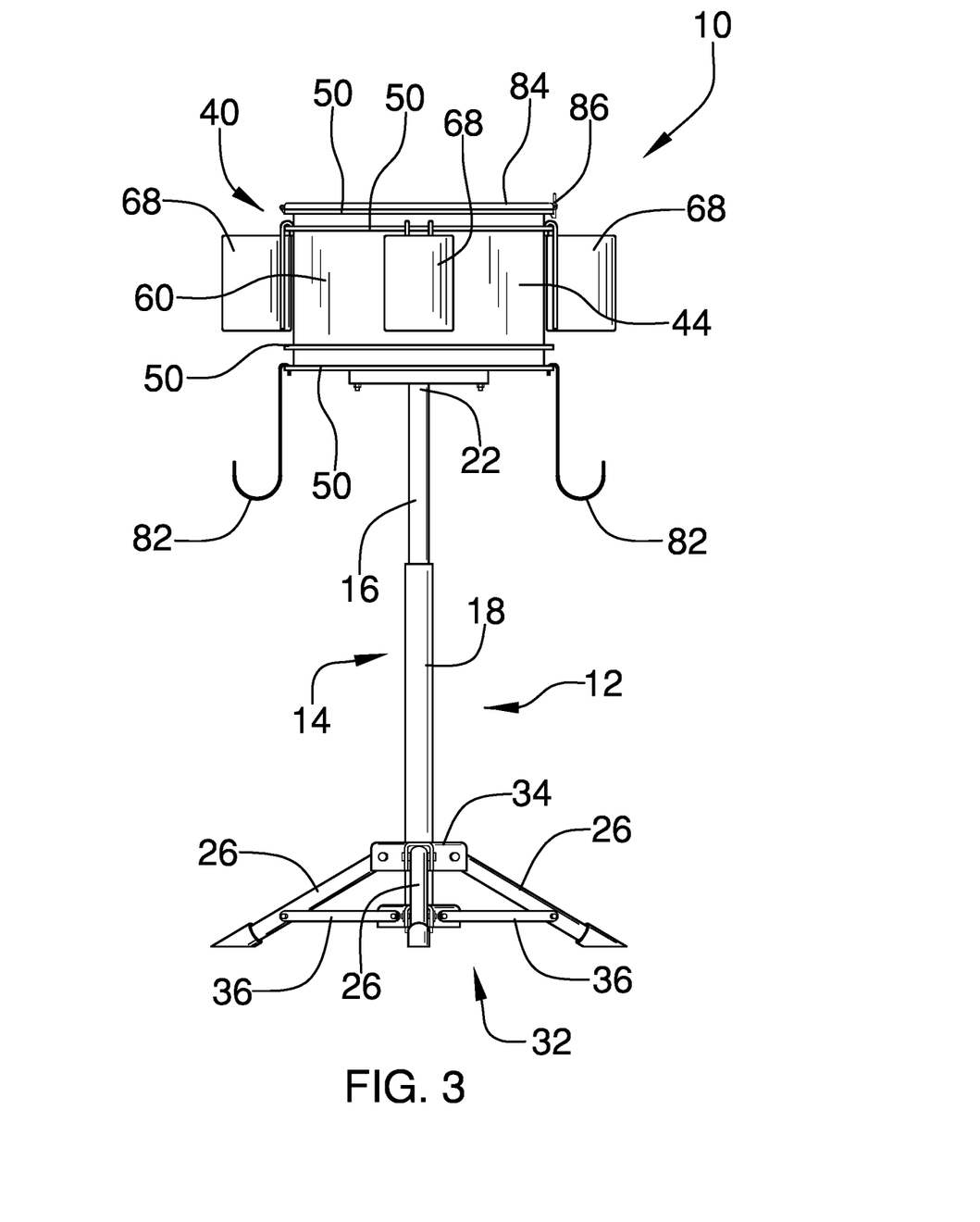
FIG. 3 is a rear view of an embodiment of the disclosure.
Figure 4:
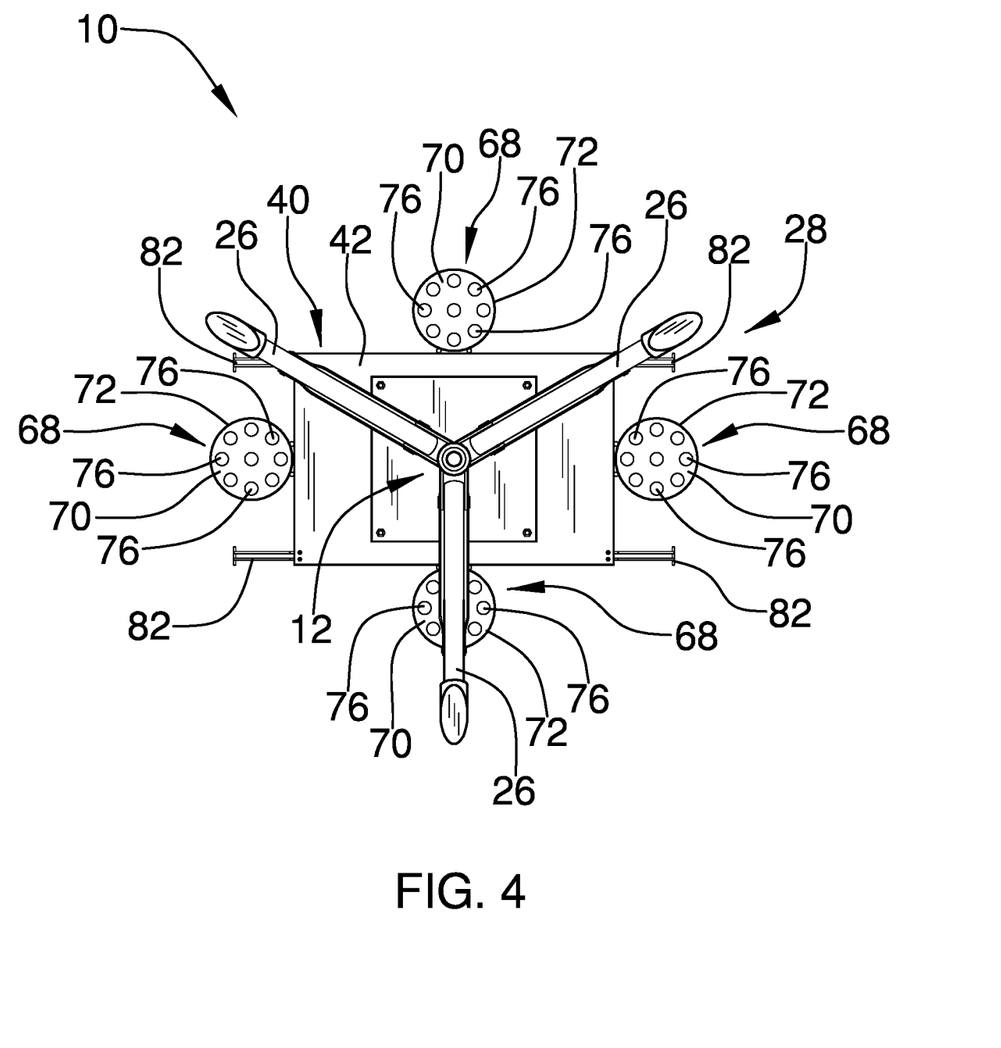
FIG. 4 is a bottom view of an embodiment of the disclosure.
Figure 5:
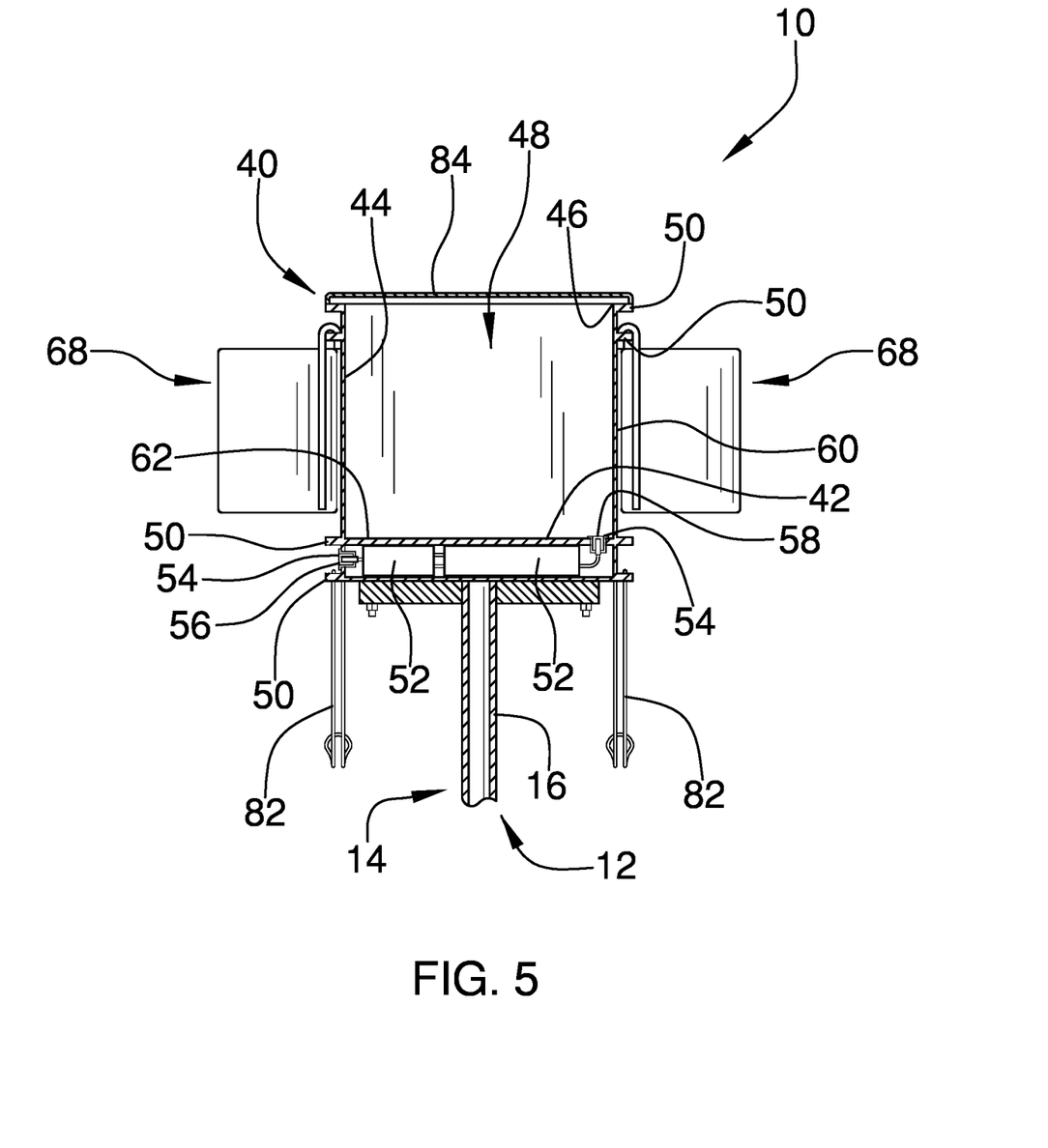
FIG. 5 is a cross-section view of an embodiment of the disclosure taken from Arrows 5-5 in FIG. 2.
Figure 6:
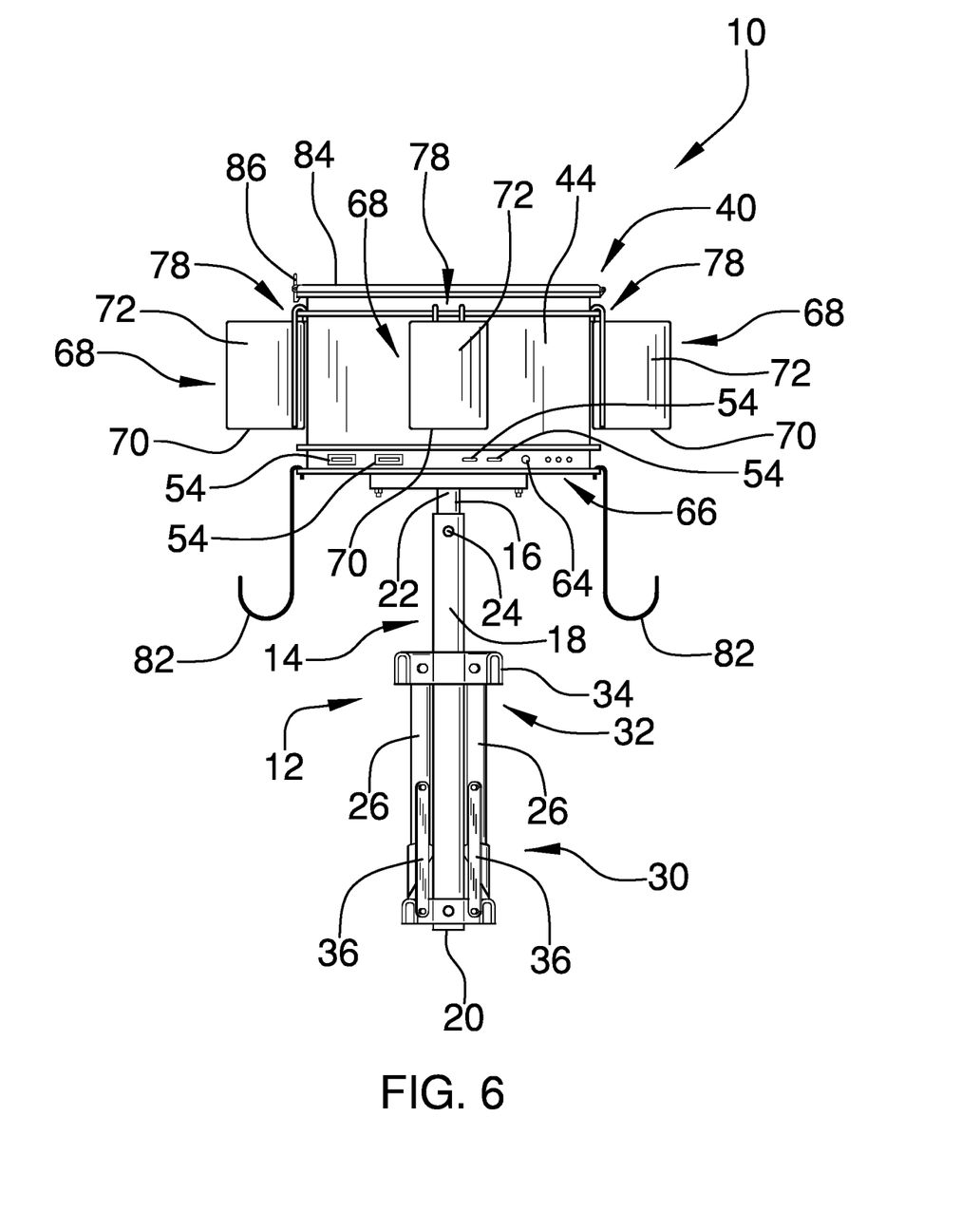
FIG. 6 is a side view of an embodiment of the disclosure with a post of a support assembly telescopically contracted and a plurality of legs of the support assembly in a collapsed configuration.
Figure 7:
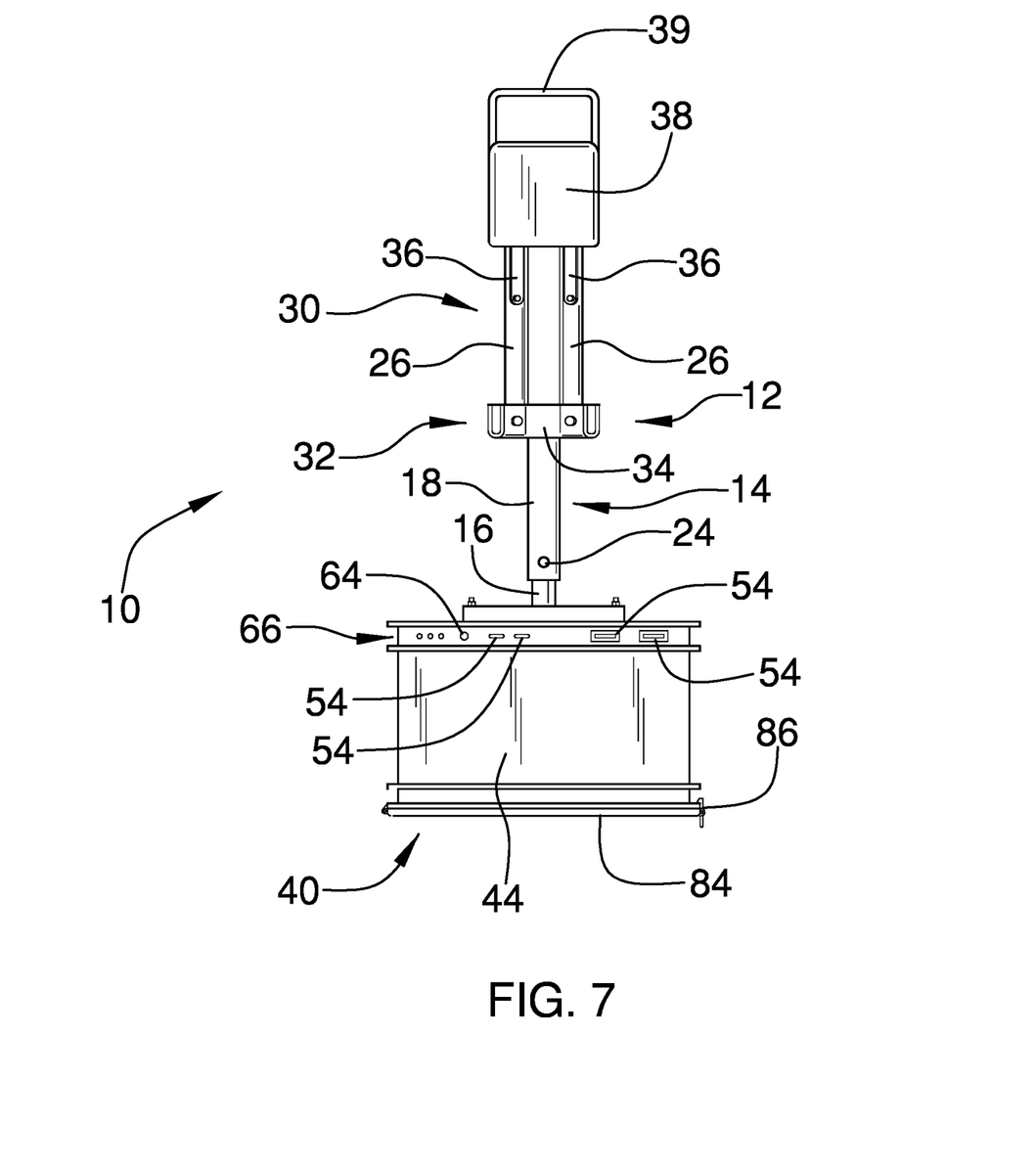
FIG. 7 is a side view of an embodiment of the disclosure with a post of a support assembly telescopically contracted and a plurality of legs of the support assembly in a collapsed configuration. A retaining cap is also fitted around the legs to secure the legs in the collapsed configuration.

The support assembly 12 further comprises a retaining cap 38 which is mountable around the legs 26 when the legs 26 are in the collapsed configuration 30 to secure the legs 26 in the collapsed configuration 30. The retaining cap 38 comprises a resiliently stretchable material such as rubber, silicone, or the like such that the retaining cap 38 contracts around the plurality of legs 26 when mounted to the plurality of legs 26. The retaining cap 38 may also attach to the legs 26 via a hook-and-loop fastener, a tie, an elastic band, or the like. The retaining cap 38 may include a handle 39 to facilitate carrying the portable stand apparatus 10 via the retaining cap 38.

A container 40 is mounted to a top end 22 of the post 14. The container 40 has a base wall 42 and a perimeter wall 44 that are coupled to each other. The perimeter wall 44 extends upwardly from the base wall 42. The base wall 42 and the perimeter wall 44 define a storage space 48, and an upper edge 46 of the perimeter wall 44 defines an opening to the storage space 48. The container 40 further comprises a plurality of ledges 50 which are coupled to and extend around the perimeter wall 44.

A power bank 52 is mounted in the base wall 42 of the container 40. The power bank 52 comprises a battery but may comprise a capacitor or other suitable power storage. A plurality of charging ports 54 is mounted on the container 40 and is electrically coupled to the power bank 52. The plurality of charging ports 54 includes at least one exterior port 56 positioned on an exterior side 60 of the container 40 and at least one interior port 58 positioned on an interior side 62 of the container 40. The plurality of charging ports 54 comprise Universal Serial Bus (USB) Type-A ports and USB Type-C ports but may comprise any suitable electrical port for charging electronic devices 90 with the power bank 52. In some embodiments, the power bank 52 may be charged via one or more of the charging ports 54, an additional port, an electrical plug, or the like. A power button 64 may be mounted to the container 40 an electrically coupled to the power bank 52. The power button 64 may be operated to selectively provide power to the charging ports 54 via the power bank 52. A power indicator 66 may also be provided which is electrically coupled to the power bank 52 to sense a power level of the power bank 52. The power bank 52 indicates the power level of the power bank 52 and may include a plurality of lights or any other suitable indicator.

A plurality of cup holders 68 is removably couplable around the perimeter wall 44 of the container 40 on the exterior side 60 of the container 40. Each cup holder 68 comprises a bottom wall 70 and a peripheral wall 72. The peripheral wall 72 is coupled to and extends away from the bottom wall 70. The bottom wall 70 and the peripheral wall 72 define a cavity 74 with an open end distal from the bottom wall 70. The bottom wall 70 has a plurality of drain holes 76 extending therethrough to facilitate draining condensation, spills, and the like from the respective cup holder 68. A plurality of holder fasteners 78 are provided for coupling the cup holders 68 to the container 40. Each holder fastener 78 comprises a holder hook 80 which is coupled to an associated cup holder 68 of the plurality of cup holders 68 and is engageable with an associated ledge 50 of the plurality of ledges 50 of the container 40. In this manner, each cup holder 68 may be removably hung on the associated ledge 50. In other embodiments, the holder fasteners 78 comprise hook-and-loop fasteners, magnets, or the like.

A plurality of towel hooks 82 is mounted to the container 40. Each towel hook 82 is sized and configured to support a towel 92 thereon. Each towel hook 82 of the plurality of towel hooks 82 is engageable with an associated ledge 50 of the plurality of ledges 50 of the container 40. A lid 84 is pivotally coupled to the container 40 such that the lid 84 is positionable to alternately open and close the opening of the storage space 48 of the container 40. A closure 86 is operable to secure the lid 84 to the container 40 in a closed position. The closure 86 comprises a latch but may comprise a hook-and-loop fastener, a snap button, a magnet, or the like. In some embodiments, the container 40 and the lid 84 may comprise thermally insulating material such that the container 40 and the lid 84 may be used as a cooler or the like.

Figure 8:
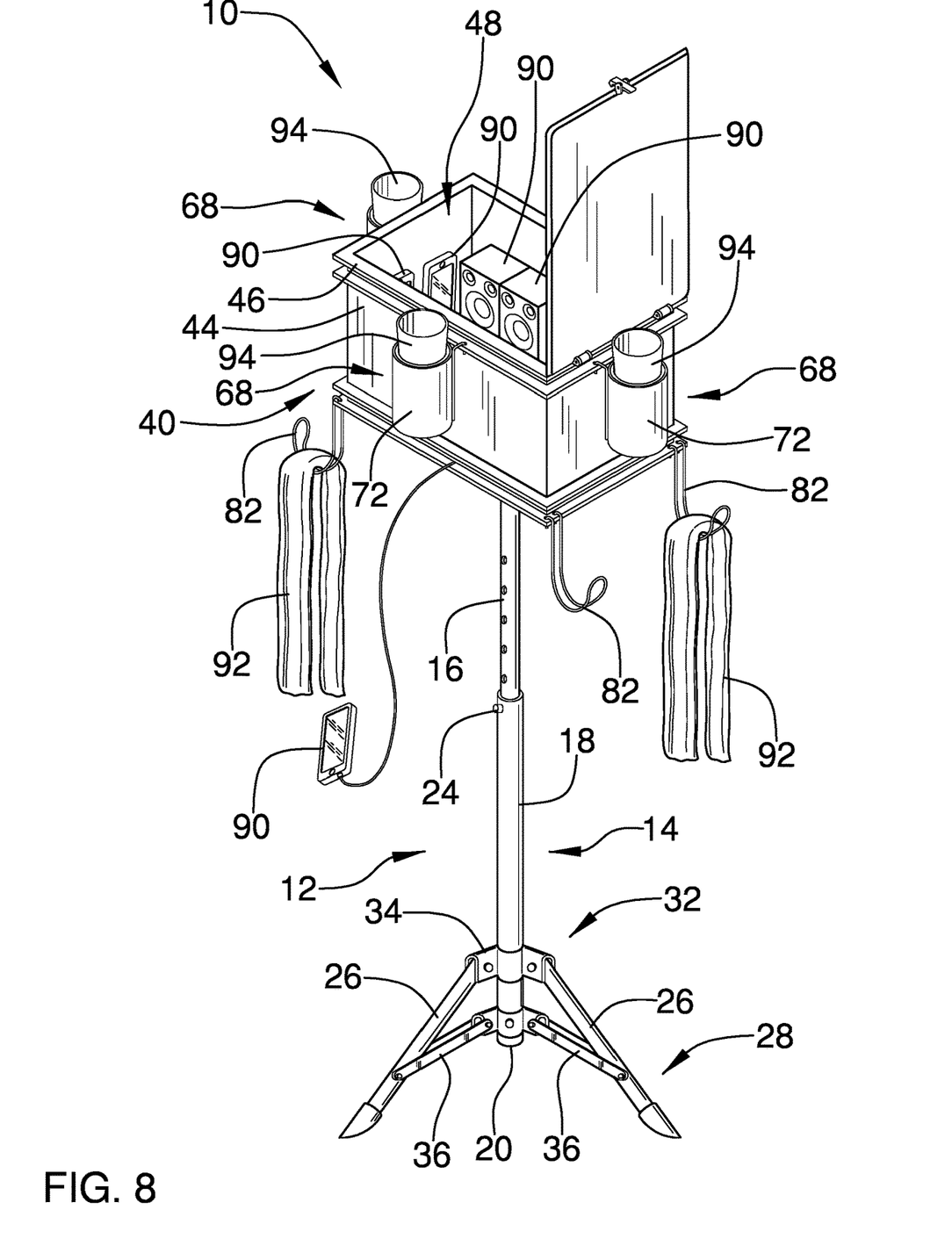
FIG. 8 is an in-use view of an embodiment of the disclosure.

In use, the portable stand apparatus 10 may be used at a pool, a sports facility, a beach, or any location where it is desirable to store items spaced above the ground. The support assembly 12 is placed on the ground surface at a selected length of the post 14 and with the legs 26 in the deployed position. Electronic devices 90, such as phones, speakers, and the like, may be charged via electrical cords coupled to the charging ports 54. While charging, the electronic devices 90 may be stored in the container 40 or outside of the container 40 as desired and as allowed by the lengths of the electrical cords. The lid 84 may be closed to guard items in the container 40 from water or other hazards. The lid 84 may also be used as a support platform when closed. The portable stand apparatus 10 may be used to store other items in addition to the electronic devices 90. Towels 92 or other items may be hung on the towel hooks 82. Drinking vessels 94 may be stored in the cup holders 68.

To transport or store the portable stand, the legs 26 of the support assembly 12 are positioned in the collapsed configuration 30 and the retaining cap 38 is positioned around the legs 26 to secure the legs 26 in the collapsed configuration 30. The cup holders 68 and the towel hooks 82 may be stored in the container 40 with the lid 84 secured in the closed position via the closure 86.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable stand apparatus comprising:
   a support assembly configured to be removably positioned atop a ground surface;
   a container mounted to a top end of the post, the container having a base wall and a perimeter wall coupled to each other, the perimeter wall extending upwardly from the base wall, the base wall and the perimeter wall defining a storage space, an upper edge of the perimeter wall defining an opening to the storage space;
   a plurality of cup holders removably couplable around the perimeter wall of the container on the exterior side of the container, each cup holder comprising a bottom wall and a peripheral wall, the peripheral wall being coupled to and extending away from the bottom wall, the bottom wall and the peripheral wall defining a cavity, the cavity having an open end distal from the bottom wall; and
   wherein the container further comprises a plurality of ledges coupled to and extending around the perimeter wall, further comprising a plurality of holder fasteners, each holder fastener of the plurality of holder fasteners being engageable with an associated cup holder of the plurality of cup holders and the container to couple the associated cup holder to the container, each holder fastener of the plurality of holder fasteners comprising a holder hook coupled to the associated cup holder, each holder hook being engageable with an associated ledge of the plurality of ledges of the container to hang the associated cup holder thereto.

2. The apparatus of claim 1, wherein the support assembly comprises:
   a post, the post being telescopically adjustable, the post having an upper member and a lower member, the upper member being slidably coupled to the lower member; and
   a plurality of legs coupled to a bottom end of the post, the plurality of legs extending downwardly and radially outwardly from the post when the plurality of legs is positioned in a deployed configuration, the plurality of legs being movable with respect to the post such that each leg is foldable toward the post to position the plurality of legs in a collapsed configuration.

3. The apparatus of claim 2, wherein the support assembly further comprises a retainer engageable with the post to retain the post in a selected length.

4. The apparatus of claim 3, wherein the retainer comprises a spring button that is biased to extend through each of the upper member and the lower member of the post.

5. The apparatus of claim 2, wherein the support assembly further comprises a linkage assembly coupled to the post and the plurality of legs to facilitate moving the plurality of legs between the deployed configuration and the collapsed configuration, the linkage assembly comprising a slider which is slidably coupled to the post and pivotally coupled to each leg of the plurality of legs, the linkage assembly comprising a plurality of links, each link of the plurality of links being pivotally coupled to the post at one end of the link and pivotally coupled to an associated leg of the plurality of legs at another end of the link.

6. The apparatus of claim 1, wherein the bottom wall of each cup holder of the plurality of cup holders has a plurality of drain holes extending therethrough.

7. The apparatus of claim 1, further comprising:
   a power bank mounted in the base wall of the container; and
   a plurality of charging ports mounted on the container and electrically coupled to the power bank.

8. The apparatus of claim 7, wherein the power bank comprises a battery.

9. The apparatus of claim 7, wherein the plurality of charging ports includes at least one exterior port positioned on an exterior side of the container, the plurality of charging ports including at least one interior port positioned on an interior side of the container.

10. The apparatus of claim 1, further comprising a plurality of towel hooks being mounted to the container, each towel hook being sized and configured to support a towel thereon.

11. The apparatus of claim 1, further comprising a lid positionable to alternately open and close the opening of the storage space of the container.

12. The apparatus of claim 11, wherein the lid is pivotally coupled to the container.

13. The apparatus of claim 11, further comprising a closure operable to secure the lid to the container in a closed position.

14. The apparatus of claim 11, wherein the closure comprises a latch.

15. The apparatus of claim 1, further comprising:
   the support assembly comprising:
      a post, the post being telescopically adjustable, the post having an upper member and a lower member, the upper member being slidably coupled to the lower member;
      a retainer engageable with the post to retain the post in a selected length, the retainer comprising a spring button that is biased to extend through each of the upper member and the lower member of the post;
      a plurality of legs coupled to a bottom end of the post, the plurality of legs extending downwardly and radially outwardly from the post when the plurality of legs is positioned in a deployed configuration, the plurality of legs being movable with respect to the post such that each leg is foldable toward the post to position the plurality of legs in a collapsed configuration;
      a linkage assembly coupled to the post and the plurality of legs to facilitate moving the plurality of legs between the deployed configuration and the collapsed configuration, the linkage assembly comprising a slider which is slidably coupled to the post and pivotally coupled to each leg of the plurality of legs, the linkage assembly comprising a plurality of links, each link of the plurality of links being pivotally coupled to the post at one end of the link and pivotally coupled to an associated leg of the plurality of legs at another end of the link; and
      a retaining cap mountable around the plurality of legs when the plurality of legs is in the collapsed configuration to secure the plurality of legs in the collapsed configuration, the retaining cap comprising a resiliently stretchable material such that the retaining cap contracts around the plurality of legs when mounted to the plurality of legs;

a power bank mounted in the base wall of the container, the power bank comprising a battery;

a plurality of charging ports mounted on the container and electrically coupled to the power bank, the plurality of charging ports including at least one exterior port positioned on an exterior side of the container, the plurality of charging ports including at least one interior port positioned on an interior side of the container;

the bottom wall having a plurality of drain holes extending therethrough;

a plurality of towel hooks being mounted to the container, each towel hook being sized and configured to support a towel thereon, each towel hook of the plurality of towel hooks being engageable with an associated ledge of the plurality of ledges of the container;

a lid positionable to alternately open and close the opening of the storage space of the container, the lid being pivotally coupled to the container; and a closure operable to secure the lid to the container in a closed position, the closure comprising a latch.

16. A portable stand apparatus comprising:

a support assembly configured to be removably positioned atop a ground surface;

a container mounted to a top end of the post, the container having a base wall and a perimeter wall coupled to each other, the perimeter wall extending upwardly from the base wall, the base wall and the perimeter wall defining a storage space, an upper edge of the perimeter wall defining an opening to the storage space;

a plurality of cup holders removably couplable around the perimeter wall of the container on the exterior side of the container, each cup holder comprising a bottom wall and a peripheral wall, the peripheral wall being coupled to and extending away from the bottom wall, the bottom wall and the peripheral wall defining a cavity, the cavity having an open end distal from the bottom wall;

wherein the support assembly comprises:

a post, the post being telescopically adjustable, the post having an upper member and a lower member, the upper member being slidably coupled to the lower member; and a plurality of legs coupled to a bottom end of the post, the plurality of legs extending downwardly and radially outwardly from the post when the plurality of legs is positioned in a deployed configuration, the plurality of legs being movable with respect to the post such that each leg is foldable toward the post to position the plurality of legs in a collapsed configuration; and wherein the support assembly further comprises a retaining cap mountable around the plurality of legs when the plurality of legs is in the collapsed configuration to secure the plurality of legs in the collapsed configuration.

17. The apparatus of claim 16, wherein the retaining cap comprises a resiliently stretchable material such that the retaining cap contracts around the plurality of legs when mounted to the plurality of legs.

18. A portable stand apparatus comprising:

a support assembly configured to be removably positioned atop a ground surface;

a container mounted to a top end of the post, the container having a base wall and a perimeter wall coupled to each other, the perimeter wall extending upwardly from the base wall, the base wall and the perimeter wall defining a storage space, an upper edge of the perimeter wall defining an opening to the storage space;

a plurality of cup holders removably couplable around the perimeter wall of the container on the exterior side of the container, each cup holder comprising a bottom wall and a peripheral wall, the peripheral wall being coupled to and extending away from the bottom wall, the bottom wall and the peripheral wall defining a cavity, the cavity having an open end distal from the bottom wall;

a plurality of towel hooks being mounted to the container, each towel hook being sized and configured to support a towel thereon; and wherein the container further comprises a plurality of ledges coupled to and extending around the perimeter wall, each towel hook of the plurality of towel hooks being engageable with an associated ledge of the plurality of ledges of the container.

* * * * *